United States Patent Office 2,910,464
Patented Oct. 27, 1959

2,910,464

TRIAZINE MONOAZO-DYESTUFFS

Alfred Fasciati and Raymond Gunst, Binningen, Switzerland, assignors to Ciba Limited, Basel, Switzerland, a Swiss firm No Drawing. Application September 9, 1957
Serial No. 682,586

Claims priority, application Switzerland
September 14, 1956

5 Claims. (Cl. 260—153)

This invention provides valuable monoazo-dyestuffs of the formula (1)
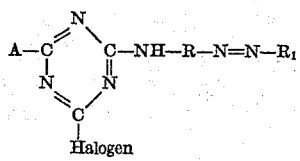

Halogen in which A represents the residue of an at most secondary amine containing an acid substituent impartnig solubility in water, R represents a benzene residue containing a sulfonic acid or carboxylic acid group, and $R_1$ represents the residue of a coupling component containing a heretocyclic six-membered ring bound to the azo linkage in a position vicinal to a keto group. The invention provides more especially dyestuffs of the above Formula 1, in which A represents the residue of an amino-benzene sulfonic acid bound through the amino group, and $R_1$ represents the residue of barbituric acid.

The characteristic triazine grouping is bound to the benzene residue R through an —NH-bridge, which is in para-position or preferably in meta-position to the azo linkage.

The above dyestuffs are made by the process of this invention by using as starting materials, which can be made by methods in themselves known, dyestuffs which containing a di-halogen-, and especially a 2:4-dichloro-1:3:5-triazine residue, and reacting one of the two chlorine atoms in the dichloro-triazine dyestuff with an amine which contains a carboxylic acid and/or sulfonic acid group. The dihalogen-triazine dyestuffs used as starting materials can be obtained by methods in themselves known by reacting a monoazo-dyestuff of the formula (2) $H_2N—R—N=N—R_1$ in which R and $R_1$ have the meanings given above, with cyanuric chloride (2:4:6-trichloro-1:3:5-triazine) in at least equimolecular proportions, or the dihalogen-triazine dyestuffs can be obtained from the appropriate dyestuff components containing the dichloro-triazine residue.

For making the starting mono-azo dyestuffs, of the Formula 2 there may be used, for example, diazo-compounds of monoacyl-derivatives of diamino benzene sulfonic acids or carboxylic acids, for example, monoacyl-derivatives of 1:4-diamino-benzene-2-carboxylic acid, 1:3-diamino-benzene-4-sulfonic acid or 1:4-diamino-benzene-3-sulfonic acid, 2-methoxy-1:4-diamino-benzene-5-sulfonic acid, the acyl residues of which are hydrolysed to liberate the amino groups after the coupling. As coupling components there may be used those compounds capable of coupling in a position vicinal to a keto group which contain a heterocyclic six-membered ring, for example, hydroxyquinolines such as 2:4-dihydroxy-quinoline and especially barbituric acid.

The condensation of the amino-azo-dyestuff obtained from the above components and containing an acylatable amino group in the residue of the diazo-component with cyanuric chloride is carried out in such manner that the resulting condensation product contains two exchangeable halogen atoms, of which one is exchanged in the process of this invention for the residue of an amino-compound of the kind defined above. As such amino-compounds there may be used, for example, glycine, phenyl-hydrazine sulfonic acids, and especially 1-amino-benzene-2:5-disulfonic acid, 1-aminobenzene-2-, -3- or -4-sulfonic acid, aminonaphthalene mono- or di-sulfonic acid, aminodiphenyl sulfonic acids, β-aminoethane sulfonic acid and N-methylamino-ethane sulfonic acid.

These amino-compounds are condensed in the process of this invention with the dihalogen-triazine dyestuffs advantageously with the use of an acid-binding agent, such as sodium acetate, sodium carbonate or sodium hydroxide, under conditions such that the final product contains an exchangeable halogen atom, that is to say, for example, in an organic solvent or at a relatively low temperature in an aqueous medium.

The invention also includes a modification of the above process for making the azo-dyestuffs of the invention. In this modification the amino-monoazo-dyestuff, which is used as starting material for making the dichloro-triazine dyestuffs and which contains an acylatable amino group in the residue of the diazo-component, for example, an amino-monoazo-dyestuff obtainable from among the components mentioned above, is condensed with a 4:6-dihalogen-1:3:5-triazine which contains the residue of an amino in the 2-position, and which residue contains an acid group imparting solubility in water, that is to say, to carboxylic acid and/or sulfonic acid group.

The dihalogen-triazines having this constitution can be obtained by methods in themselves known from a cyanuric halide such as cyanuric bromide or cyanuric chloride, for example, by reacting one molecular proportion of cyanuric chloride with one molecular proportion of an amine of the kind defined above.

The dihalogen-triazine compounds so obtained can be condensed, for the purpose of making the monoazo-dyestuffs of the invention, with preformed amino-monoazo dyestuffs of the kind defined above, which contain an acylatable amino group in the residue of the diazo-component, or advantageously with a diazo-component suitable for making the said dyestuffs and containing an acylatable amino group in addition to the group capable of dyestuff formation.

As examples of diazo-components so obtainable, which contain a triazine residue of the kind defined above, there may be mentioned, the secondary condensation products obtained from one molecular proportion of cyanuric chloride and one molecular proportion of an amino-benzene sulfonic acid and one molecular proportion of 1:4-diamino-benzene-2-carboxylic acid, 1:3-diamino-benzene-4-sulfonic acid, 1:4-diamino-benzene-3-sulfonic acid or 2-methoxy-1:4-diamino-benzene-5-sulfonic acid.

In making the dyestuffs of the invention by condensing one of the aforesaid amino-monoazo-dyestuffs with a cyanuric halide and one of the simpler amino-sulfonic acids or amino-carboxylic acids described above, the steps of the condensation may generally be carried out in either order of succession. On the other hand, in making the dyestuffs by the coupling procedure the necessary condensations for making the secondary condensation products to be used as diazo-components are as a rule advantageously carried out by first forming the monoamino-dihalogen-triazine and subsequently condensing the latter with the appropriate diazo-component.

The dyestuffs of the invention can be isolated and worked up into useful dry dyestuff preparations. The isolation is preferably carried out at as low a temperature as possible by salting out and filtration. The filtered dyestuffs can be dried, if desired, after the addition of an extender or buffer. Advantageously the drying is carried out at not too high a temperature and under reduced pressure. In certain cases dry preparations can be obtained directly by spray drying the whole mixture in which the dyestuff is made, that is to say, without first isolating the dyestuff.

The new dyestuffs of the invention are suitable for dyeing and printing a very wide variety of materials, especially cellulose-containing materials of fibrous structure, such as linen, regenerated cellulose and especially cotton. They are especially suitable for dyeing by the so-called pad dyeing process, in which the material is impregnated with an aqueous solution of the dyestuff, which may also contain a salt, and the dyestuff is fixed on the material by an alkaline treatment or with the aid of heat. This process and the direct dyeing method, which is also suitable for many of the dyestuffs of the invention, and also the printing method, yield dyeings or prints which are usually distinguished by the purity of their tints, their very good fastness to light and above all by their excellent fastness to washing.

The following examples illustrate the invention the parts and percentages being by weight.

*Example 1*

33.6 parts of the primary condensation product obtained from 1 mol of cyanuric chloride and 1 mol of 1:3-diamino benzene-4 sulfonic acid are stirred in 300 parts of water, 300 parts of ice and 20 parts of hydrochloric acid of 30 percent strength and diazotised at 0–2° C. with 25 parts by volume of a 4 N-solution of sodium nitrite. The diazo-suspension so obtained, which is acid to Congo, is run into a solution of the sodium salt of 12.8 parts of barbituric acid in 200 parts of water, which solution also contains 30 parts of sodium carbonate, while stirring well at room temperature. When the coupling is finished, the excess of alkali is neutralised by the cautious addition of hydrochloric acid and the mixture is adjusted to a pH-value of 6.5. A solution of 23 parts of 1-amino-3-acetylaminobenzene-6-sulfonic acid in 200 parts of water is then added to the reaction mixture, and the whole is heated to 40° C. and maintained at that temperature for 2 hours while stirring. By adding a 1 N-solution of sodium hydroxide dropwise the pH value of the reaction mixture is maintained at about 6.

By the addition of sodium chloride the secondary condensation product so formed is precipitated, filtered off and dried at 40–50° C.

The resulting dyestuff dyes cellulose fibers by the so called pad dyeing process very fast greenish yellow tints.

Similar greenish yellow dyestuffs are obtained by using in this example, instead of 1-amino-3-acetylaminobenzene-6-sulfonic acid, the following amino-compounds: 1-aminobenzene-2-, -3- or -4-sulfonic acid, 2-aminobenzoic acid, dehydrothioluidine monosulfonic acid, 4-amino-4′-benzoyl-aminostilbene-2:2′-disulfonic acid or amino ethane sulfonic acid (taurine).

In many cases these dyestuffs can be made by a reversal of the above procedure, for example, by condensing 1 mol of cyanuric chloride first with 1 mol of amino-ethane sulfonic acid and then with 1 mol of 1:3-diaminobenzene-4-sulfonic acid, and finally by diazotising the secondary condensation product of the formula

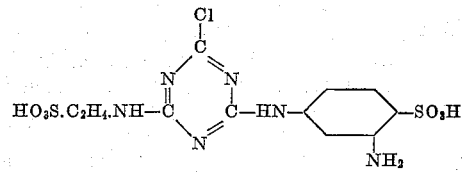

and coupling it with barbituric acid.

By the same method similar dyestuffs are obtained by coupling the secondary condensation products given in column I of the following table with the coupling components given in column II, the said dyestuffs dyeing cotton by the so-called pad dyeing process tints having good properties of wet fastness and the colors given in column III.

| | I | II | III |
|---|---|---|---|
| 1 | 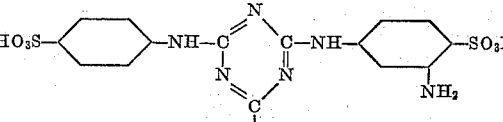 | 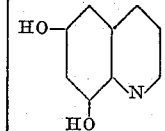 | Orange yellow. |
| 2 | 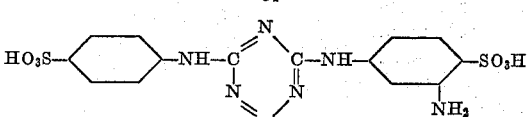 | 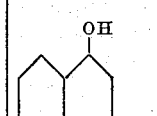 | Yellow. |
| 3 | 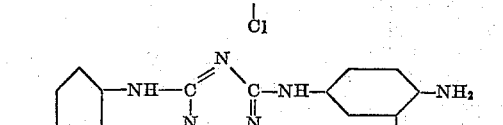 | 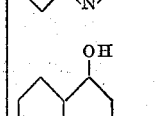 | Reddish yellow. |
| 4 | 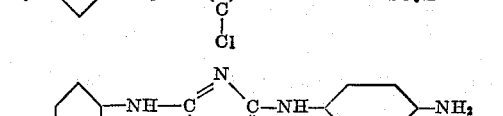 | Barbituric acid | Greenish yellow. |

Example 2

2 parts of the dyestuff of the formula

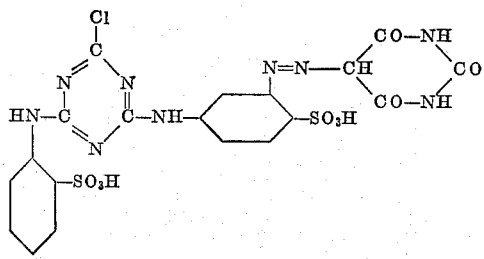

are dissolved in 100 parts of water by the addition of 1 part of sodium hydroxide. A cotton fabric is impregnated with the solution at room temperature, then squeezed until its increase in weight is 70 percent, and dried. The fabric is then steamed for 60 seconds, rinsed, soaped for 15 minutes in a boiling solution of about 0.3 percent strength of a non-ionic detergent, rinsed and dried. There is obtained a greenish-yellow dyeing which is fast to washing and light.

What is claimed is:

1. A water-soluble monoazo dyestuff of the formula

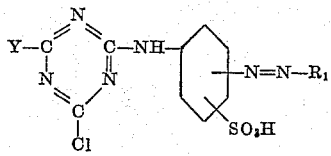

in which Y represents a radical selected from the group consisting of phenyl-amino and lower alkyl-amino groups, said radical containing a member selected from the group consisting of —COOH and —SO$_3$H bound to one of its carbon atoms, and R$_1$ represents a member selected from the group consisting of the barbituric acid radical and the dihydroxyquinoline radical.

2. A mono-azo dyestuff which in its free acid state corresponds to the formula

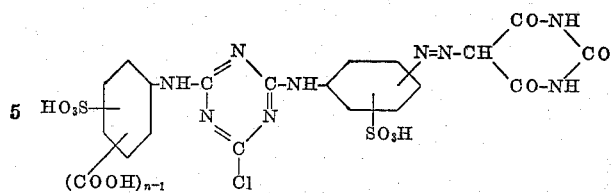

in which $n$ represents a whole positive number up to and including 2.

3. The mono-azo dyestuff which in its free acid state corresponds to the formula

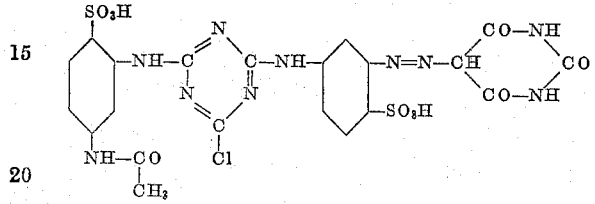

4. The mono-azo dyestuff which in its free acid state corresponds to the formula

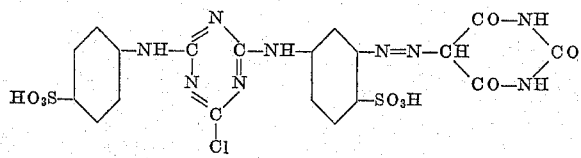

5. The mono-azo dyestuff which in its free acid state corresponds to the formula

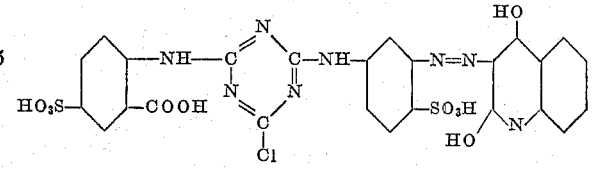

References Cited in the file of this patent

FOREIGN PATENTS

| | | |
|---|---|---|
| 578,014 | Great Britain | June 12, 1946 |
| 1,128,353 | France | Aug. 20, 1956 |